May 27, 1969   L. A. MOLBY   3,446,376
REVERSING MECHANISM FOR INDUSTRIAL VEHICLE
Filed April 27, 1967
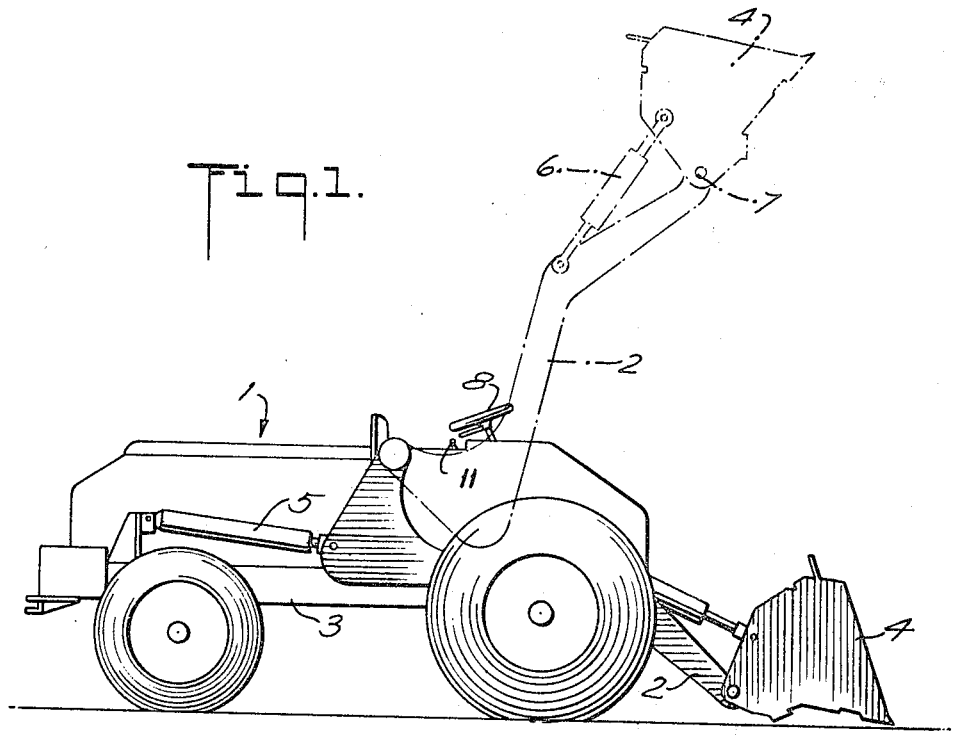
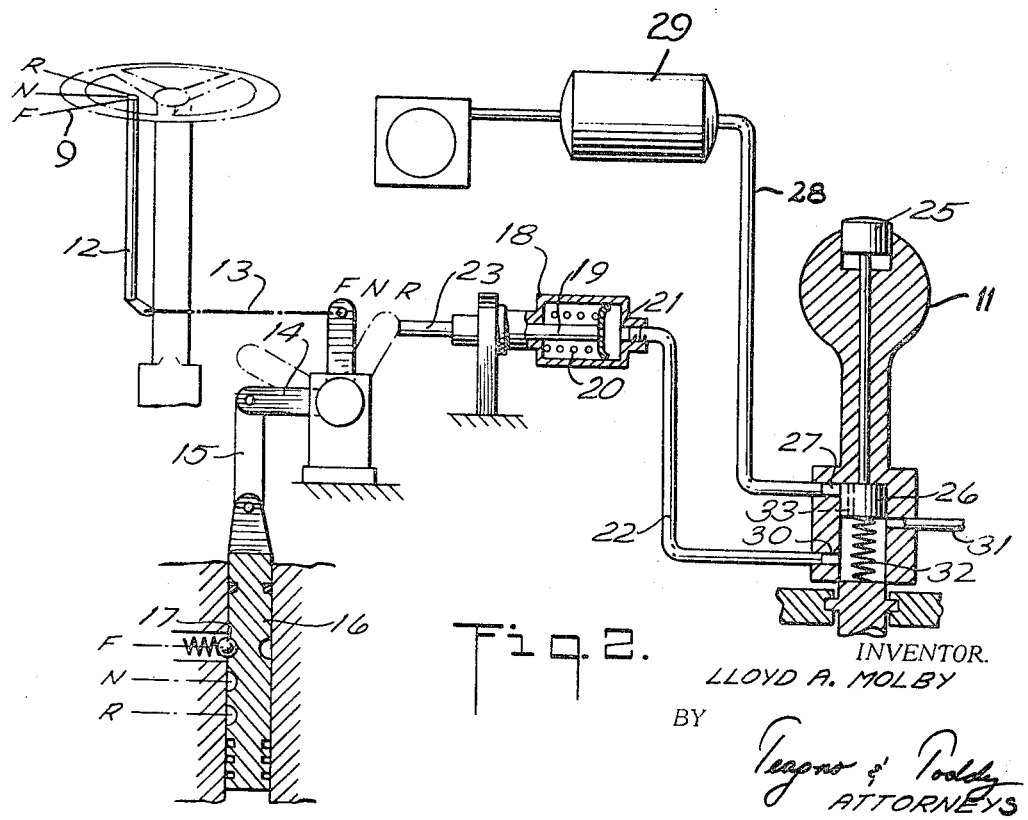
INVENTOR.
LLOYD A. MOLBY
BY
Teagno & Toddy
ATTORNEYS

United States Patent Office 3,446,376
Patented May 27, 1969

3,446,376
REVERSING MECHANISM FOR INDUSTRIAL VEHICLE
Lloyd A. Molby, Elba, N.Y., assignor to Eaton Yale & Towne Inc., Cleveland, Ohio, a corporation of Ohio
Filed Apr. 27, 1967, Ser. No. 634,325
Int. Cl. B66f 9/20
U.S. Cl. 214—140                                        6 Claims

ABSTRACT OF THE DISCLOSURE

A material handling vehicle having several hand controls including a hand operated direction control which is remotely actuated from another of the controls so that the operator may change direction of the vehicle and at the same time operate the other controls.

---

This invention relates to an industrial vehicle, and more particularly, a vehicle loader of the type in which a shovel or bucket is adapted to be lifted and lowered as well as moved to dumping position by rams. The rams are controlled by the operator of the vehicle through a lever that he manipulates. Thus, the lever will first put the bucket or shovel in position to accept the load. Thereafter, the lever will bring about the lifting of the load and also may bring about its dumping.

In a vehicle of the class described, the shovel or bucket is first placed in a low position and the vehicle is moved forward bringing the shovel into contact with the earth or other material that is being handled. Forward movement of the vehicle is brought about by the placing of the transmission control handle of the vehicle in a forward position. Once the shovel is loaded with the material being handled, the operator will move the directional control handle into reverse position. The vehicle will now move rearwardly and the operator will hold one hand on the steering wheel to steer the vehicle, placing his other hand on the shovel or bucket control lever. Generally, he will wish to operate this lever so as to raise the load. Once he has the load raised to a particular position and the vehicle backed as much as he desires, he will wish to drive the vehicle forward once again while at the same time controlling the position of the shovel so as to prepare for the dumping of the load. At the same time, he will be steering the vehicle. The operator will find it almost impossible to shift from reverse position back to forward position without removing his hand from the shovel control lever. This means that the operator must withdraw at least one of his hands from the steering wheel or the bucket control lever as the case may be, in order to change the direction of the vehicle. This he cannot do without substantially stopping the movement of the vehicle.

I have conceived a construction whereby the operator of a vehicle of the class described may reverse its direction without interfering with the efficient operation of the vehicle. Thus, my contribution makes it possible for the operator, with the vehicle moving rearwardly and the shovel loaded, to control the movement of the shovel as required, steer the vehicle as required, and bring about a reversal of its direction so that it will again move forwardly. This I accomplish by utilizing preferably an air operated cylinder for moving the directional control valve from a reverse directional position to a forward directional position through use of control means mounted on the lever that controls the movement of the shovel. Further, it is a feature of my invention that when the valve is moved to forward position, it together with the directional control handle are rendered free for movement back to a reverse directional position without hindrance by the air operated cylinder through which the directional valve was restored to a forward directional position.

Thus, it is possible through my invention, to place the vehicle in reverse drive, after which the operator holds one hand on the steering wheel and one hand on the shovel control lever. Once he has moved back to a particular desired position, the operator can steer the tractor loader, bring about its movement in a forward direction, and still simultaneously effect movement of the shovel. In other words, the operator can at all times operate his vehicle in a most efficient manner and at high speed. Also, it will be remembered that with the vehicle moving in a forward direction, should it then be desired to reverse once again, there will be no interference present to prevent movement of the directional handle to a reverse position.

Other advantages of my invention will become apparent from the following description when read in conjunction with the accompanying drawings wherein:

FIG. 1 is a side elevational view of an industrial vehicle to which my reversing control may be applied; and
FIG. 2 is a schematic view of my reversing control.

Referring to the drawings, in particular to FIG. 1, a tractor loader 1 is shown having arms 2 which are pivoted to the tractor body 3 and are adapted to raise a bucket 4 from the position shown in solid lines in FIG. 1 to the position shown in broken lines. The arms 2 are actuated by lift arms 5 which are mounted on each side of the tractor body. A suitable actuator, such as a ram 6, is provided to tilt the bucket 4 about the pivot 7 as is necessary to perform the forward digging, loading, and dumping operations of the bucket.

Also, the tractor loader is maneuvered during the loading and unloading operations and such maneuvering is performed by movement of the steering wheel 8, while forward and reverse movement of the loader is controlled by the control handle 9 which is mounted on the steering column 10. Further, the lift rams 5 are actuated by a control lever 11.

As shown in FIG. 2 of the drawings, the control handle 9 is adapted to be moved in a forward position F, a neutral position N and a reverse position R. Movement of the control handle 9 operates a series of interconnected levers 12 and 13 which terminate at a bell crank 14. The bell crank 14 operates a link 15 which is connected to a valve spool 16 which hydraulically controls the position of the tractor loader transmission. A detent ball 17 holds the valve 16 in either a neutral, forward or reverse position and since the valve is connected to the control handle 9, the handle in turn is yieldingly held in each of these positions.

In accordance with my invention, I provide an air cylinder 18 having a piston 19 which is pressed by a spring 20 in a normally retracted position, as shown by solid lines in the drawings. The piston 19 is movable into a protracted position when air pressure is introduced into the cylinder at 21 through the line 22. Movement of the piston 19 by air pressure relatively into the cylinder 18 will cause the end 23 of the piston to strike the bell crank 14 and rotate the bell crank counterclockwise to its position shown in the drawings. In the position shown in the drawings, the bell crank 14, and valve 16 and the control handle 9 are in forward drive position.

To control the admission of air into the cylinder 18 at 21, I utilize a push button 25 carried by the lever 11. As indicated, the lever 11 is used by the operator for controlling the raising and lowering of the bucket 4. Thus, the operator is able to move the push button 25 when he so desires, while still controlling the bucket. In the normal position of the push button 25, the spool 26 closes port 27 which communicates through a line 28 to a source of fluid pressure 29. In this position, the line 22 is vented through the port 30 through an exhaust passage 31. When the push button 25 is depressed against the bias of spring 32, the spool 26 closes the passage 31 and exposes the orifice 27 so that fluid pressure is conducted through the line 22 by way of the orifice 33 extending through the spool 26. When the push button 25 is released, fluid from the cylinder 18 will be exhausted, as indicated above, and the spring 32 will move the spool and the push button 25 to the position shown in the drawings.

It is seen that I have conceived a construction whereby the operator of a vehicle of the class described may reverse its direction without interfering with the efficient operation of the vehicle. My construction makes it possible for the operator, with the vehicle moving rearwardly and the shovel loaded, to control the movement of the shovel as required by actuating the control handle 11, to steer the vehicle as required, and at the same time, bring about the reversal of direction of the vehicle so that it will again move forwardly. This is accomplished by depressing the push button 25 to effect communication of fluid into cylinder 18 to actuate the piston 19 into its protracted position. In this position, the end 23 of the piston 19 engages the bell crank 14 and moves the operating lever 9 and the transmission control valve 16 from rearward to forward position.

Also since the piston 19 will be moved into its retracted position immediately upon release of the push button 25, the control lever 9 and the bell crank 14 are rendered free for movement back to a reverse directional position by the operator without hindrance by the piston 19 through which the directional control valve 16 was restored to a forward directional position.

I now claim:

1. In a vehicle of the class described, the combination comprising a direction control member movable freely at all times between extreme forward and reverse control positions, linkage means for manually moving said control member, means yieldingly holding said member in at least one of its said extreme control positions, a power device for moving said linkage means and said direction control member from said one extreme position to its opposed extreme position, means for energizing said power device to so move said control member, and a manually operated device for effecting the operation of said energizing means.

2. The combination of claim 1, in which said vehicle has a steering wheel and a lever or the like for controlling the movement of a load member, and said manually operated device is mounted on said lever.

3. The combination of claim 1, in which said power device is a fluid operated piston that is moved by fluid pressure to move in turn said direction control member to said opposed extreme position, a spring for pressing said piston to its initial position, and an exhaust passage for said piston to permit its spring return to its initial positon.

4. The combination of claim 3, in which said energizing means includes a valve means for alternately connecting said piston to a source of fluid pressure or to an exhaust port, with said source of fluid pressure closed when said piston is connected to the exhaust port.

5. In a vehicle of the class described, the combination comprising, a steering wheel, a directional hand lever movable with a direction control device to forward, neutral and reverse directional determinating positions with detent means yielding holding said lever in said positions, a bucket controlling handle, a source of air pressure, a cylinder having a piston, a valve alternately connecting said cylinder to said source of air pressure and to atmosphere and normally maintained in position connecting said cylinder to atmosphere while closing the source of air pressure against flow of air therefrom to said piston or atmosphere, a valve operating device on said bucket controlling handle for moving said valve from its said normal position to a position for momentarily connecting thte cylinder to said source of air pressure and then restoring said valve to said normal position, the flow of air from said source to said piston moving said piston to move said hand lever from any position to said forward position.

6. A vehicle as claimed in claim 5 in which said hand lever is rendered manually operable after it is moved to said forward position.

References Cited

UNITED STATES PATENTS 3,187,913   6/1965   Strader et al.  ------ 214—764 X
3,198,360   8/1965   Strader et al.  -------- 214—764

HUGO O. SCHULZ, *Primary Examiner.*

U.S. Cl. X.R.

180—77